US011007663B2

(12) United States Patent
Saito

(10) Patent No.: US 11,007,663 B2
(45) Date of Patent: May 18, 2021

(54) DEVICE FOR RELEASING CATCH BETWEEN PRECUT SUBSTRATES, ROBOT, AND ROBOT SYSTEM THEREFOR

(71) Applicant: FANUC CORPORATION, Yamanashi (JP)

(72) Inventor: Shunichi Saito, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 115 days.

(21) Appl. No.: 14/858,323

(22) Filed: Sep. 18, 2015

(65) Prior Publication Data

US 2016/0082615 A1   Mar. 24, 2016

(30) Foreign Application Priority Data

Sep. 22, 2014   (JP) .............................. JP2014-193066

(51) Int. Cl.
*B26D 7/18* (2006.01)
*B26F 3/00* (2006.01)
*B25J 9/16* (2006.01)

(52) U.S. Cl.
CPC .......... *B26D 7/1836* (2013.01); *B25J 9/1679* (2013.01); *B26D 7/1818* (2013.01); *B26F 3/002* (2013.01); *Y10S 901/02* (2013.01); *Y10T 225/329* (2015.04); *Y10T 225/371* (2015.04); *Y10T 225/386* (2015.04)

(58) Field of Classification Search
CPC ..... B26D 7/1836; B26D 7/1818; B26F 3/002; Y10T 225/325; Y10T 225/329; Y10T 225/371; Y10T 225/379; Y10T 225/386; Y10T 225/393

USPC .................................. 225/96.5, 97, 103–106
See application file for complete search history.

(56) References Cited

U.S. PATENT DOCUMENTS

| 4,113,162 | A | * | 9/1978 | Boehm et al. | .......... C03B 33/09 225/2 |
|---|---|---|---|---|---|
| 4,232,809 | A | * | 11/1980 | Boehm et al. | .......... C03B 33/09 225/93 |
| 4,278,193 | A | * | 7/1981 | Pereman et al. | ........ C03B 33/04 225/2 |
| 5,297,710 | A | * | 3/1994 | Juras | ..................... C03B 33/033 225/105 |
| 5,452,981 | A | * | 9/1995 | Crorey et al. | ......... B21D 43/05 100/207 |

(Continued)

FOREIGN PATENT DOCUMENTS

| JP | 63162192 A | 7/1988 |
|---|---|---|
| JP | 07314391 A | 12/1995 |

(Continued)

*Primary Examiner* — Clark F Dexter
(74) *Attorney, Agent, or Firm* — RatnerPrestia

(57) ABSTRACT

A device capable of separating a remnant from a product part irrespective of a shape of the remnant. The device includes a first attraction part which attracts a first part and is moved downward; a second attraction part provided movable relative to the first attraction part to attract a second part; a jig which comes into contact with a back surface of the second part to prevent the second part from moving downward; and further a position maintaining part which maintains a position of the second attraction part relative to the first attraction part when the first attraction part is moved downward to separate the first part from the second part.

4 Claims, 8 Drawing Sheets

(56) References Cited

U.S. PATENT DOCUMENTS

| | | | | | |
|---|---|---|---|---|---|
| 5,873,773 | A | * | 2/1999 | Bando | C03B 33/027 125/23.01 |
| 6,055,895 | A | * | 5/2000 | Kanazawa | B21D 43/18 414/752.1 |
| 6,218,793 | B1 | * | 4/2001 | Bando | C03B 33/027 225/96.5 |
| 7,131,361 | B2 | * | 11/2006 | Nakajima | B23Q 7/04 414/793 |
| 8,584,918 | B2 | * | 11/2013 | Su et al. | B26F 3/002 225/23 |
| 2004/0232188 | A1 | * | 11/2004 | Lisec | B65G 49/064 225/2 |
| 2011/0143639 | A1 | * | 6/2011 | Bando | B65G 49/064 451/44 |
| 2013/0181026 | A1 | * | 7/2013 | Su et al. | B26F 3/002 225/103 |

FOREIGN PATENT DOCUMENTS

| | | |
|---|---|---|
| JP | 09117893 A | 5/1997 |
| JP | 2004174685 A | 6/2004 |
| JP | 2008213128 A | 9/2008 |
| JP | 2012-250871 A | 12/2012 |

* cited by examiner

DEVICE FOR RELEASING CATCH BETWEEN PRECUT SUBSTRATES, ROBOT, AND ROBOT SYSTEM THEREFOR

BACKGROUND ART

1. Technical Field

The invention relates to a device for releasing a catch between precut substrates, a robot, and a robot system therefor.

2. Description of Related Art

A device is known which holds a remnant of a substrate by a chuck to separate the remnant from a product part of the substrate (e.g. Japanese Laid-Open Patent Publication No. 2012-250871).

According to the above device, if the remnant is provided to surround the periphery of the product part, the remnant and the product part are tangled with each other, so that it will be difficult to separate the remnant from the product part. Thus, according to prior art, it is impossible to release the catch between the remnant and the product part depending on the shape of the remnant.

SUMMARY OF THE INVENTION

In one aspect of the invention, a device for releasing a catch between a first part and a second part of a substrate precut into the first part and the second part, comprises a first attraction part which attracts the first part and is moved in a first direction, and a second attraction part which is provided to be movable relative to the first attraction part and which attracts the second part.

The device further comprises a jig which contacts the second part from a side opposite the second attraction part so as to prevent the second part from moving in the first direction, and a position maintaining part which maintains a position of the second attraction part with respect to the first attraction part when the first attraction part is moved in the first direction thereby the first part is separated from the second part.

The substrate may be a flat plate. The first direction may be a direction perpendicular to a surface of the substrate. The second attraction part may be movable relative to the first attraction part in a direction parallel to the first direction.

In another aspect of the invention, a robot comprises the above-described device and a robot arm to which the first attraction part is attached. In a further aspect of the invention, a robot system comprises the above-described robot and a controller which controls the robot.

The controller may attract the first part and the second part by the first attraction part and the second attraction part, respectively, and operate the robot arm so as to move the first attraction part in the first direction, thereby pushing the first part which is attracted by the first attraction part in the first direction so as to separate the first part from the second part.

The controller may operate the position maintaining part so as to maintain a position of the second attraction part relative to the first attraction part when the first part is separated from the second part.

The controller may operate the robot arm so as to move the first attraction part in a second direction opposite to the first direction while maintaining the position of the second attraction part relative to the first attraction part.

BRIEF DESCRIPTION OF THE DRAWINGS

The foregoing or other objects, features and advantages of the invention will become more apparent from the following description of a preferred embodiment when taken in conjunction with the accompanying drawings, in which.

DETAILED DESCRIPTION

Figure 1:
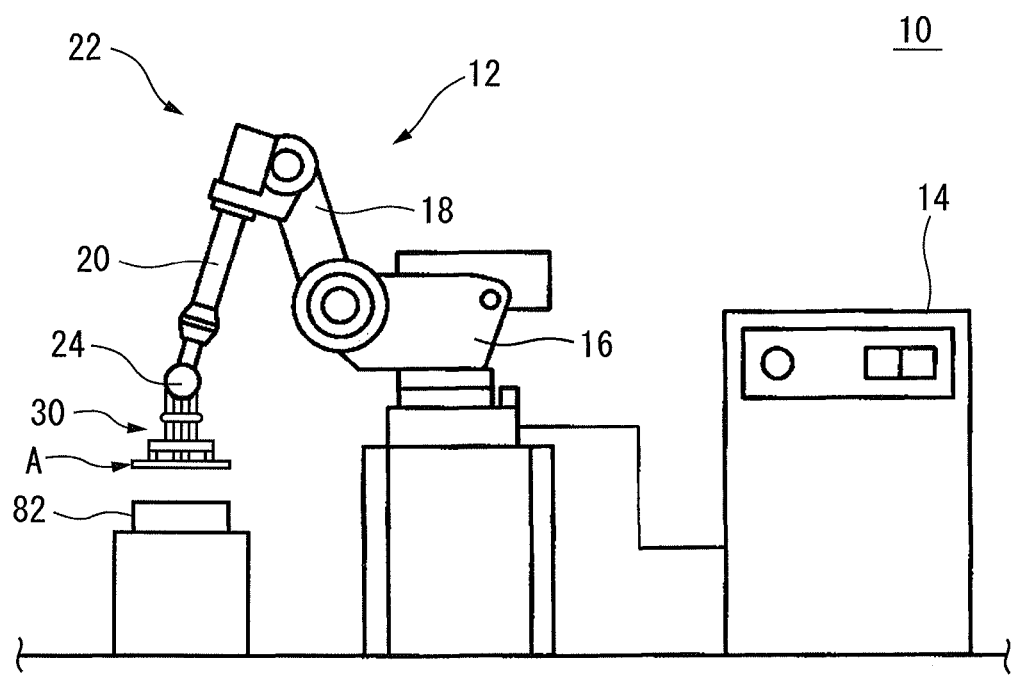
FIG. 1 is a schematic view of a robot system according to an embodiment.

In the following, an embodiment of the invention will be described in detail based on the drawings. First, referring to FIG. 1, a robot system 10 according to an embodiment of the invention will be described. The robot system 10 is for releasing a catch between a remnant and a product part of a substrate A which is cut into the remnant and the product part in advance.

The robot system 10 includes a robot 12 and a controller 14 which controls the robot 12. In the present embodiment, the robot 12 is a vertical articulated robot having a plurality of axes. Specifically, the robot 12 includes a robot arm 22 having a lower arm 18 attached to a rotary drum 16 and a front arm 20 attached to the lower arm 18; and a device 30.

Figure 2:
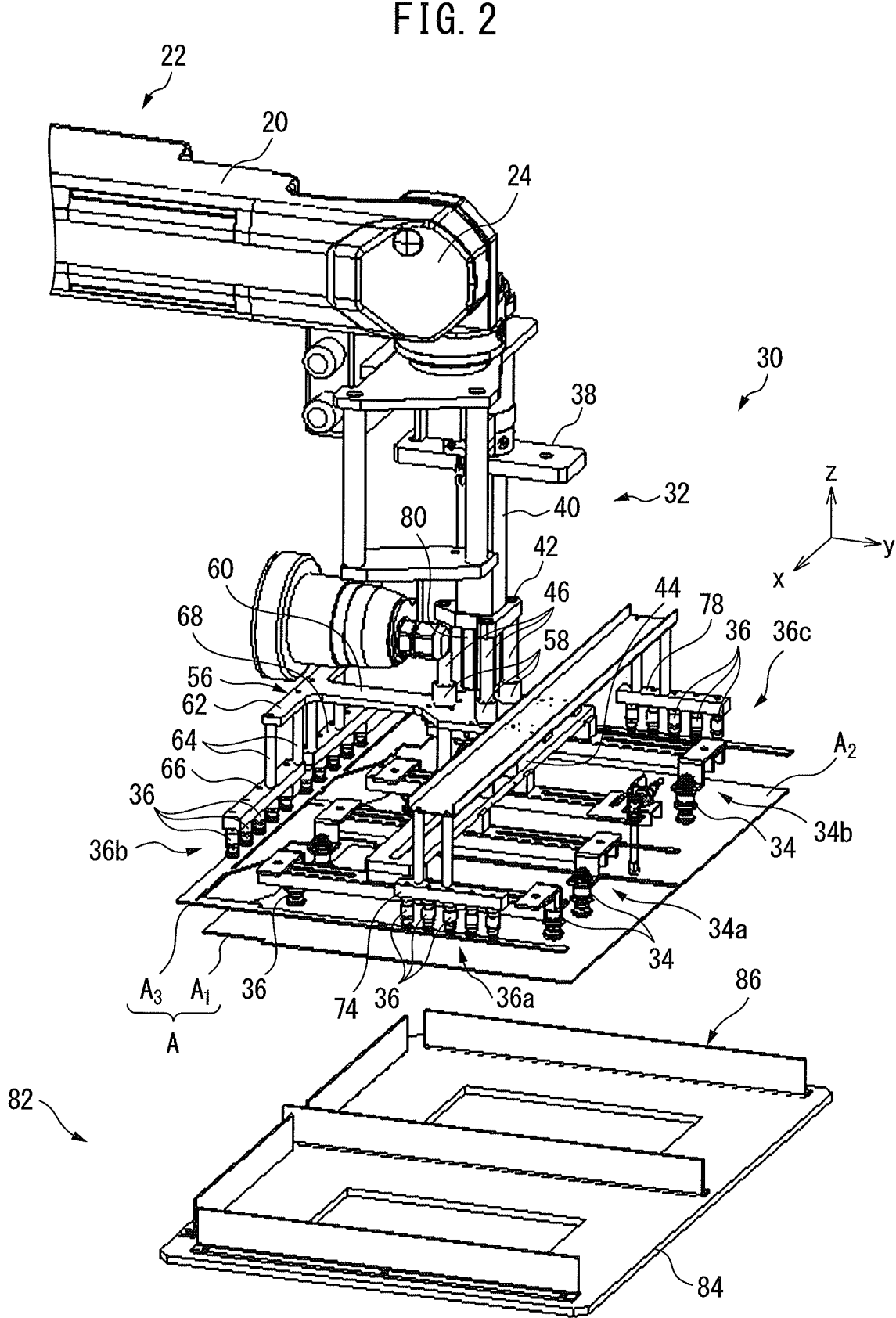
FIG. 2 is a perspective view of the device shown in FIG. 1.
Figure 3:
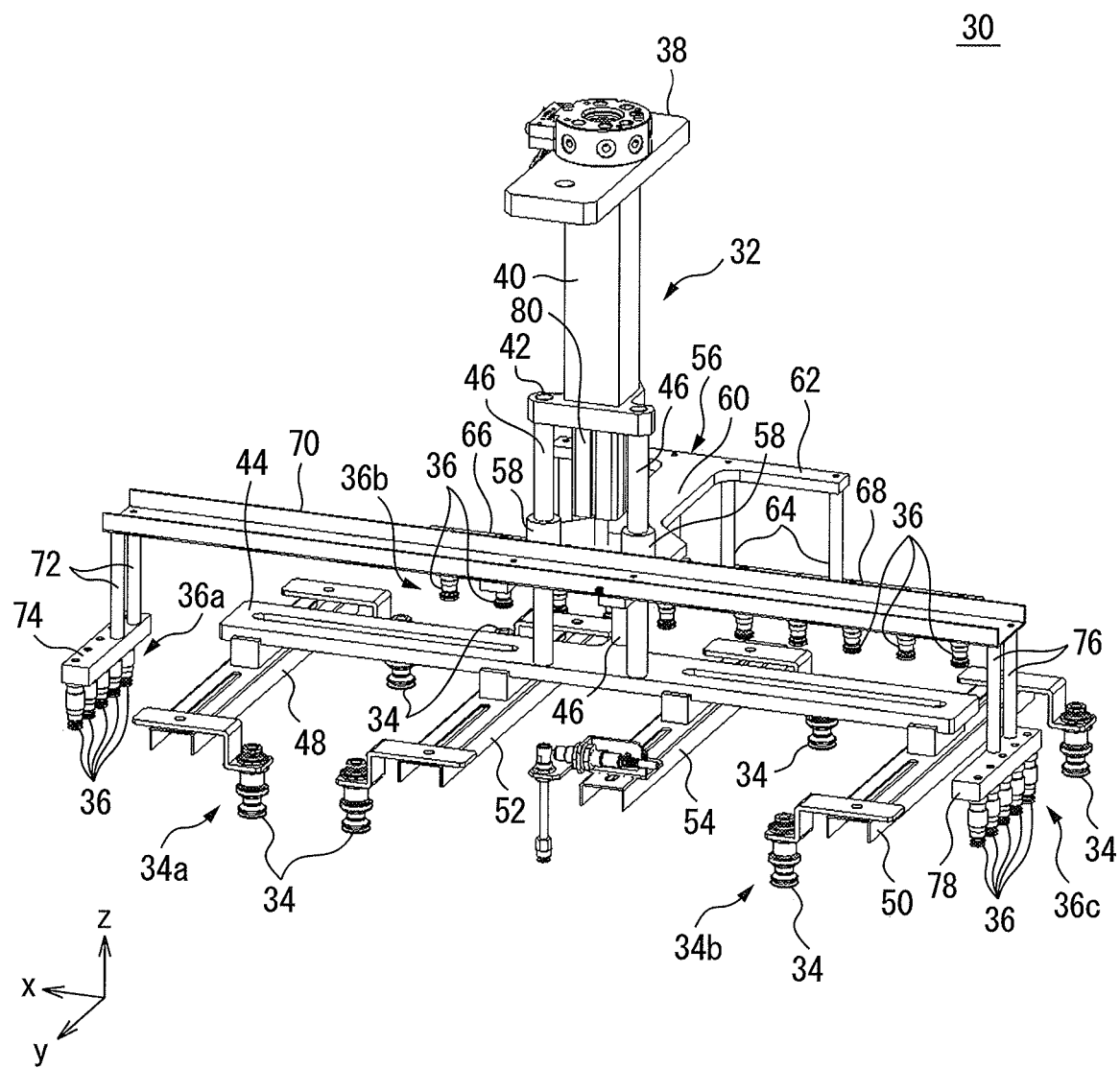
FIG. 3 is a perspective view of the device shown in FIG. 2, in which the substrate and the jig are omitted.

Next, referring to FIG. 2 and FIG. 3, the device 30 according to the present embodiment will be described. FIG. 2 illustrates a perspective view of the device 30 which holds the substrate A after separation. Note that, in the following description, an x-axis, a y-axis and a z-axis are determined as shown in FIG. 2 and FIG. 3, and an x-axis plus direction indicates the leftward direction, a y-axis plus direction indicates the frontward direction, and a z-axis plus direction indicates the upward direction.

The device 30 includes a base 32, a plurality of product attraction parts (first attraction parts) 34 and a plurality of remnant attraction parts (second attraction parts) 36. The base 32 is attached to a wrist 24 of the above-described robot arm 22.

Specifically, the base 32 includes a pedestal part 38 connected to the wrist 24; a pillar 40 extending downward from the pedestal part 38; a three-forked flange 42 provided at the pillar 40; a base arm 44 disposed so as to be downwardly separated from the flange 42; and shafts 46 extending between the flange 42 and the base arm 44.

In the present embodiment, a total of three shafts 46 are provided. Each of the shafts 46 is substantially cylindrical, and straightly extends downward from the flange 42 to the base arm 44.

The base arm 44 extends straightly in the left-right direction. A support arm 48 is fixed to the left end bottom of the base arm 44 so as to extend in the front-rear direction. A total of two product attraction parts 34 are fixed to the support arm 48 at the front and rear ends of the support arm 48.

On the other hand, a support arm 50 is fixed to the right end bottom of the base arm 44 so as to extend in the front-rear direction. A total of two product attraction parts 34 are fixed to the support arm 50 at the front and rear ends of the support arm 50.

Similarly, support arms 52 and 54 are fixed to the center bottom of the base arm 44 so as to extend in the front-rear direction. The support arm 52 is arranged at the right side of the support arm 48 so as to be spaced away from the support arm 48. The support arm 54 is arranged between the support arms 52 and 50.

A total of two product attraction parts 34 are fixed to the support arm 52 at the front and rear ends of the support arm 52. On the other hand, one product attraction part 34 is fixed to the support arm 54 at the rear end of the support arm 54. Thus, in the present embodiment, the base 32 holds a total of seven product attraction parts 34.

A movable part 56 is fit to the shafts 46 of the base 32 so as to be movable in the up-down direction. Specifically, the movable part 56 includes a total of three cylindrical parts 58, each of which receives each shaft 46 therein; a main plate 60 extending rearward from the lower ends of these cylindrical parts 58; and an arm plate 62 connected to the rear end of the main plate 60 and extending in the left-right direction.

Each of the cylindrical parts 58 is slidable relative to the shaft 46 received therein. Thereby the movable part 56 can move in the up-down direction along the shafts 46 between the flange 42 and the base arm 44. A total of four rods 64 are fixed to the bottom surface of the arm plate 62 so as to extend downward.

A support arm 66 extending in the left-right direction is fixed to the lower ends of the two rods 64 on the left side among the four rods 64. Similarly, a support arm 68 extending in the left-right direction is fixed to the lower ends of the two rods 64 on the right side among the four rods 64. A total of five remnant attraction parts 36 are fixed to the bottom surface of the support arm 66. Similarly, a total of five remnant attraction parts 36 are fixed to the bottom surface of the support arm 68.

A movable arm 70 is fixed to the front end of the movable part 56 so as to extend in the left-right direction. Two rods 72 are fixed to the left end of the movable arm 70 so as to extend downward, and a support arm 74 extending in the front-rear direction is fixed to the lower ends of these rods 72. A total of five remnant attraction parts 36 are fixed to the bottom surface of the support arm 74.

Similarly, two rods 76 are fixed to the right end of the movable arm 70 so as to extend downward, and a support arm 78 extending in the front-rear direction is fixed to the lower ends of these rods 76. A total of five remnant attraction parts 36 are fixed to the bottom surface of the support arm 78.

Thus, in the present embodiment, the movable part 56 holds a total of 20 remnant attraction parts 36. Accordingly, these remnant attraction parts 36 are movable relative to the base 32 and the product attraction parts 34 via the movable part 56.

In the present embodiment, each of the product attraction parts 34 and the remnant attraction parts 36 is constituted by an air suction type attraction device. Each of the product attraction parts 34 and the remnant attraction parts 36 generates a negative pressure at a contact surface with the substrate A so as to attract the substrate A, in response to a command from the controller 14.

The device 30 further includes a position maintaining part 80. The position maintaining part 80 acts on the movable part 56 so as to hold the movable part 56 at a certain position along the shafts 46, in response to a command from the controller 14. For example, the position maintaining part 80 is comprised of a hydraulic or pneumatic cylinder.

In this case, the position maintaining part 80 includes a piston mechanically connected to the movable part 56, and maintains the position of the movable part 56 relative to the shafts 46 by balancing an air pressure in the cylinder in response to a command from the controller 14. As a result, the positions of the remnant attraction parts 36 supported by the movable part 56 are also maintained with respect to the product attraction parts 34 supported by the base 32.

The device 30 further includes a jig 82 disposed below the substrate A. Next, referring to FIG. 2 and FIG. 4, the jig 82 will be described. The jig 82 includes a main body 84 and a rising part 86 extending upward from the main body 84.

The rising part 86 includes a first, second and third rising parts 86a, 86b and 86c which extend in the front-rear direction, and a fourth and fifth rising parts 86d and 86e which extend in the left-right direction.

Figure 4:
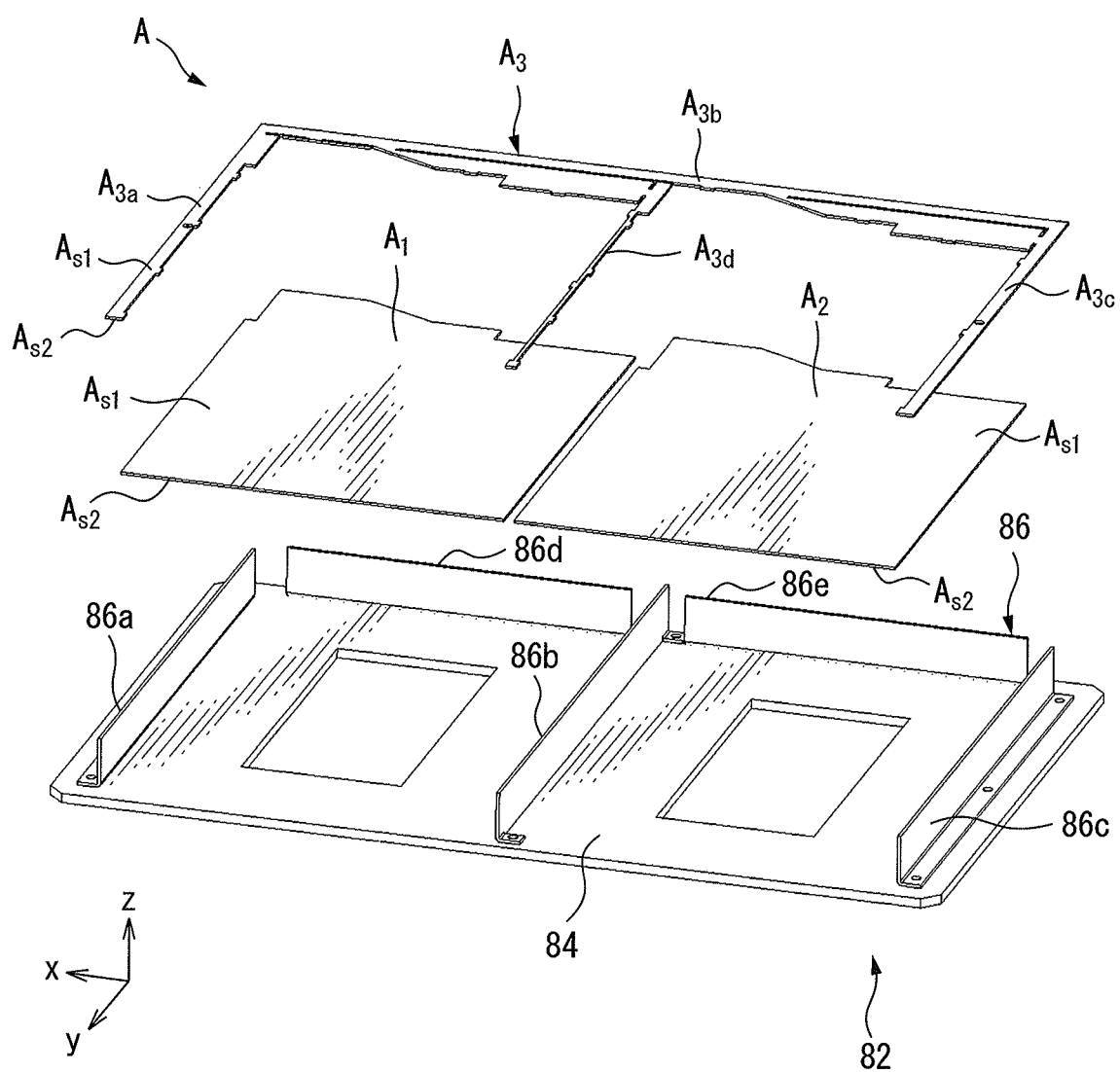
FIG. 4 is a perspective view of the substrate and the jig shown in FIG. 2.

Next, referring to FIG. 4, the substrate A will be briefly described. In the present embodiment, the substrate A is a flat plate having a flat top surface $A_{s1}$ and a flat back surface $A_{s2}$ opposite the top surface $A_{s1}$. The substrate A is cut in advance into two product parts $A_1$ and $A_2$ (first part) and one remnant $A_3$ (second part) by a machine tool for cutting (not shown).

In FIG. 4, for easy understanding, the remnant $A_3$ is illustrated as being apart from the product parts $A_1$ and $A_2$. However, it should be noted that, just after the cutting process of the substrate A, the product parts $A_1$ and $A_2$ are tangled with the remnant $A_3$ so as to form one plate-shaped member.

The substrate A is attracted by the above-described product attraction parts 34 and remnant attraction parts 36, and held to be substantially horizontal, i.e., held so that the z-axis in the figures is perpendicular to the top and back surfaces $A_{s1}$ and $A_{s2}$. In the present embodiment, the remnant $A_3$ is formed to surround the product parts $A_1$ and $A_2$ from the left, rear and right sides.

Specifically, the remnant $A_3$ includes a rear part $A_{3b}$ extending in the left-right direction, a left part $A_{3a}$ extending frontward from the left end of the rear part $A_{3b}$, a right part $A_{3c}$ extending frontward from the right end of the rear part $A_{3b}$, and a center part $A_{3d}$ extending frontward from the center of the rear part $A_{3b}$.

The product part $A_1$ is surrounded by the left, rear and center parts $A_{3a}$, $A_{3b}$ and $A_{3d}$ of the remnant $A_3$. The product part $A_2$ is surrounded by the right, rear and center parts $A_{3c}$, $A_{3b}$ and $A_{3d}$ of the remnant $A_3$.

As shown in FIG. 4, the rising part 86 of the jig 82 is disposed at a position corresponding to the remnant $A_3$ of the substrate A. Specifically, the first rising part 86a, the second rising part 86b, the third rising part 86c, the fourth rising part 86d and the fifth rising part 86e of the rising part 86 are disposed so as to respectively correspond to the left part $A_{3a}$, the center part $A_{3d}$, the right part $A_{3c}$, the left half of the rear part $A_{3b}$, and the right half of the rear part $A_{3b}$ of the remnant $A_3$.

The above-described product attraction parts 34 and remnant attraction parts 36 are disposed at positions corresponding to the product parts $A_1$, $A_2$ and the remnant $A_3$. More specifically, referring to FIG. 3 and FIG. 4, a total of four product attraction parts 34 fixed to the support arms 48 and 52 are disposed at positions corresponding to the product part $A_1$ so as to be able to attract the product part $A_1$. These four product attraction parts 34 constitute a first group 34a of the product attraction parts 34.

In addition, a total of three product attraction parts 34 fixed to the support arms 54 and 50 are disposed at positions corresponding to the product part $A_2$ so as to be able to attract the product part $A_2$. These three product attraction parts 34 constitute a second group 34b of the product attraction parts 34.

On the other hand, a total of five remnant attraction parts 36 fixed to the support arm 74 are disposed at positions corresponding to the left part $A_{3a}$ of the remnant $A_3$ so as to be able to attract the left part $A_{3a}$. These five remnant attraction parts 36 constitute a first group 36a of the remnant attraction parts 36.

In addition, a total of ten remnant attraction parts 36 fixed to the support arms 66 and 68 are disposed at positions corresponding to the rear part $A_{3b}$ of the remnant $A_3$ so as to be able to attract the rear part $A_{3b}$. These ten remnant attraction parts 36 constitute a second group 36b of the remnant attraction parts 36.

In addition, a total of five remnant attraction parts 36 fixed to the support arm 78 are disposed at positions corresponding to the right part $A_{3c}$ of the remnant $A_3$ so as to be able to attract the right part $A_{3c}$. These five remnant attraction parts 36 constitute a third group 36c of the remnant attraction parts 36.

Thus, in the present embodiment, the first group 34a and the second group 34b of the product attraction parts 34 are disposed to be adjacent to each other in the left-right direction, and surrounded by the first group 36a, the second group 36b and the third group 36c of the remnant attraction parts 36 from the left, rear and right side.

In the present embodiment, when adsorbing the top surface $A_{s1}$ of the substrate A by the product attraction parts 34 and the remnant attraction parts 36, the movable part 56 is arranged at a position at which the movable part 56 contacts the base arm 44 (i.e., the lowermost position of the stroke of the movable part 56), so that the attraction surfaces of the product attraction parts 34 and the remnant attraction parts 36 are arranged on substantially the same plane.

Next, referring to FIG. 5 to FIG. 8, the operation of the robot system 10 will be described. The operation flow shown in FIG. 5 starts when the controller 14 receives an operation command from a user to separate the substrate A. At Step S1, the controller 14 attracts the precut substrate A.

Specifically, the controller 14 operates the robot arm 22 so as to arrange the base 32 of the device 30 at a predetermined position above the substrate A which has been subjected to the cutting process by the machine tool for cutting.

For example, the controller 14 reads out a robot program pre-recorded in a memory built in the controller 14, and operates the robot arm 22 in accordance with the robot program so as to arrange the base 32 at the predetermined position above the substrate A.

At this time, the movable part 56 is arranged at the position at which the movable part 56 contacts the base arm 44 (i.e., the lowermost position of its stroke), and the attraction surfaces of the product attraction parts 34 and the remnant attraction parts 36 are arranged on substantially the same plane.

Thus, in the present embodiment, the movable part 56 is arranged at the lowermost position of its stroke by the action of gravity, thereby the product attraction, parts 34 and the remnant attraction parts 36 are arranged at their attraction position for attracting the substrate A. At this time, the controller 14 may operate the position maintaining part 80 so as to maintain the position of the movable part 56, which is arranged at the lowermost position of its stroke, with respect to the shafts 46.

As another example, a second position maintaining part (not shown) other than the position maintaining part 80 may be provided. This second position maintaining part may be operated to maintain the position of the movable part 56, which is arranged at the lowermost position of its stroke, with respect to the shafts 46. Similarly to the above-mentioned position maintaining part 80, the second position maintaining part may be comprised of a hydraulic or pneumatic cylinder to act on the movable part 56.

Then, the controller 14 operates the robot arm 22 so as to move the base 32 toward the substrate A so that the attraction surfaces of the product attraction parts 34 and the remnant attraction parts 36 contacts the top surface $A_{s1}$ of the substrate A. As a result, the first group 34a of the product attraction parts 34 contacts the product part $A_1$ of the substrate A, and the second group 34b of the product attraction parts 34 contacts the product part $A_2$ of the substrate A.

On the other hand, the first group 36a of the remnant attraction parts 36 contacts the left part $A_{3a}$ of the substrate A, the second group 36b of the remnant attraction parts 36 contacts the rear part $A_{3b}$ of the substrate A, and the third group 36c of the remnant attraction parts 36 contacts the right part $A_{3c}$ of the substrate A. Then, the controller 14 drives the product attraction parts 34 and the remnant attraction parts 36 so as to attract the top surface $A_{s1}$ of the substrate A by the product attraction parts 34 and the remnant attraction parts 36.

Note that, when having maintained the position of the movable part 56 relative to the shaft 46 by the position maintaining part 80 in order to attract the substrate A by the product attraction parts 34 and the remnant attraction parts 36, the controller 14 may stop the operation of the position maintaining part 80 so as to release the movable part 56 after having attracted the substrate A by the product attraction parts 34 and the remnant attraction parts 36.

At Step S2, the controller 14 moves the substrate A above the jig 82 of the device 30. Specifically, the controller 14 operates the robot arm 22 in accordance with the robot program so as to position the base 32 at a predetermined position above the jig 82. This state is shown in FIG. 6.

Figure 6:
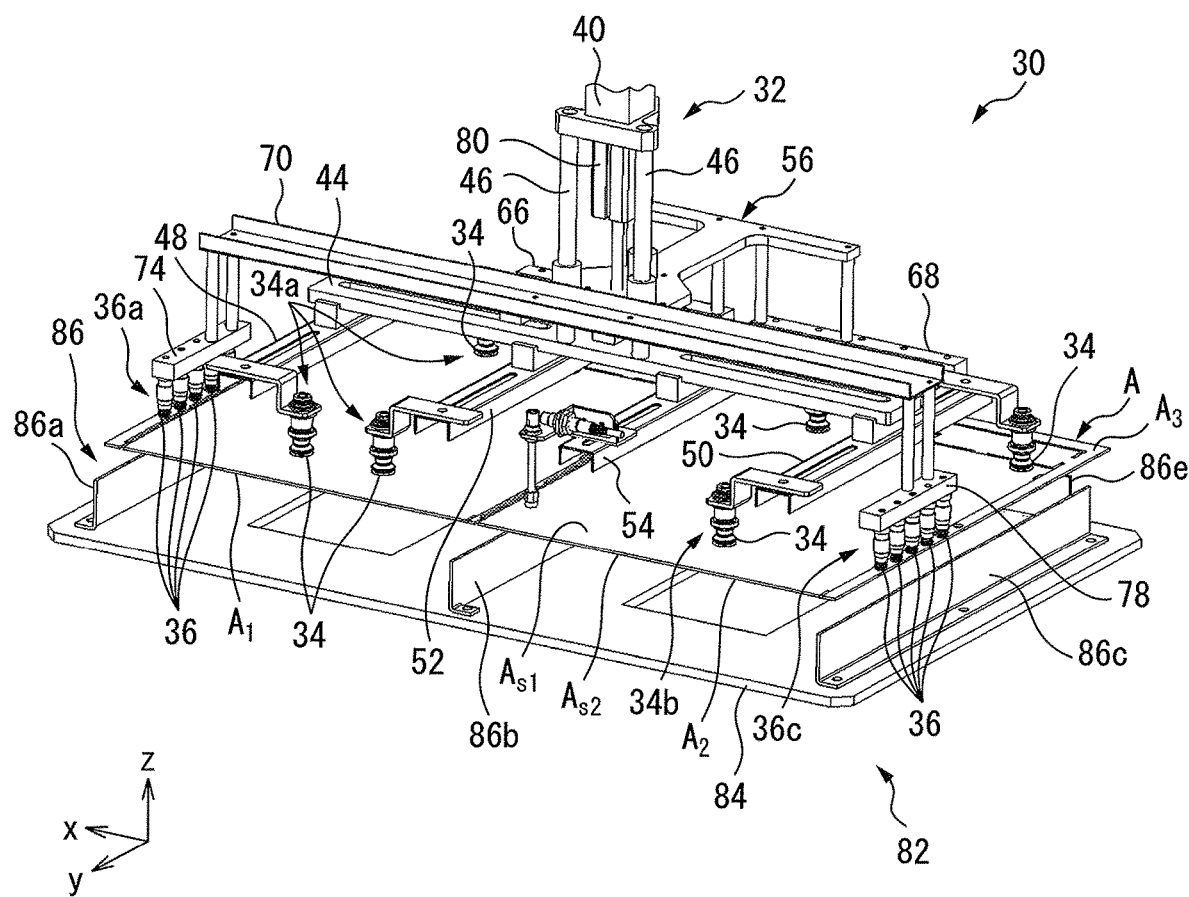
FIG. 6 is a perspective view showing a state where the device shown in FIG. 2 attracts the substrate so as to position the substrate above the jig.

As shown in FIG. 6, by the Step S2, the first rising part 86a, the second rising part 86b and the third rising part 86c of the jig 82 is respectively positioned just below the left part $A_{3a}$, the center part $A_{3d}$ and the right part $A_{3c}$ of the remnant $A_3$. In addition, the fourth rising part 86d and the fifth rising part 86e of the jig 82 are positioned just below the rear part $A_{3b}$ of the remnant $A_3$.

At Step S3, the controller 14 causes the substrate A to be pressed against the jig 82 to release a catch between the product parts $A_1$, $A_2$ and the remnant $A_3$ of the substrate A. In particular, the controller 14 operates the robot arm 22 so as to move the base 32 in the downward direction (a first direction) from the position shown in FIG. 6.

As a result, the substrate A is also moved downward together with the base 32, thereby the rising part 86 of the jig 82 contacts the back surface $A_{s2}$ of the remnant $A_3$. Due to this, the further downward movement (i.e. movement toward the back surface $A_{s2}$ side) of the remnant $A_3$ is prevented, as a result of which the downward movements of the remnant attraction parts 36 and the movable part 56 are also prevented.

On the other hand, as the base 32 is moved downward by the robot arm 22, the product parts $A_1$ and $A_2$ attracted by the product attraction parts 34 are pushed downward by the product attraction parts 34 so as to move downward (i.e. move toward the back surface $A_{s2}$ side) together with the base 32.

As described above, the movable part 56 which holds the remnant attraction parts 36 is movable along the shafts 46. Accordingly, as the base 32 moves downward, the movable part 56 relatively moves along the shafts 46.

Due to this, the remnant $A_3$ is sandwiched and fixed between the remnant attraction parts 36 and the rising part 86, while the product parts $A_1$ and $A_2$ are pushed to move downward by the product attraction parts 34.

As a result, a shearing force is generated at the boundary surface between the product parts $A_1$, $A_2$ and the remnant $A_3$ so as to release the catch between the product parts $A_1$, $A_2$ and the remnant $A_3$, thereby the product parts $A_1$ and $A_2$ are separated from the remnant $A_3$. This state is shown in FIG. 7.

Figure 7:
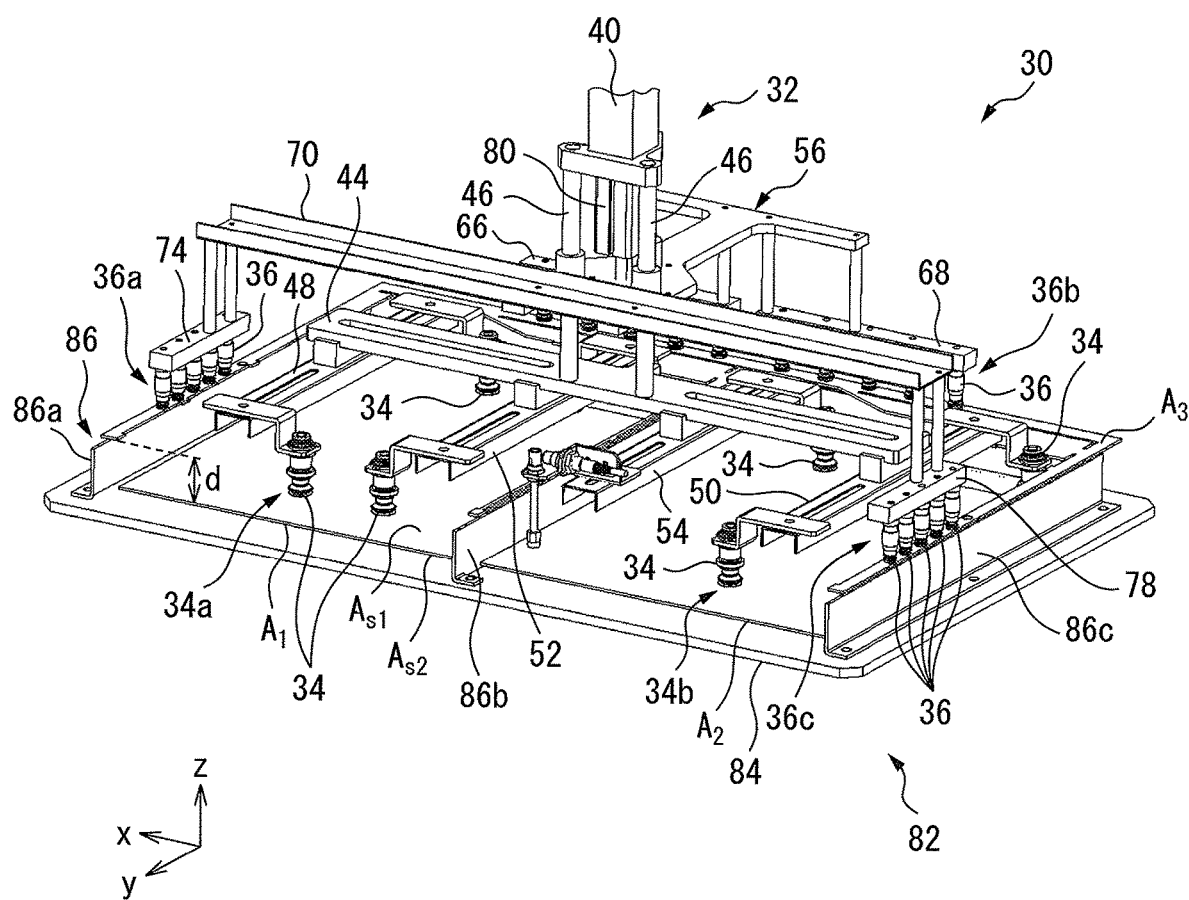
FIG. 7 is a perspective view showing a state where the substrate shown in FIG. 6 is pressed against the jig so as to separate the product part and the remnant from each other.

As shown in FIG. 7, by this Step S3, the product parts $A_1$ and $A_2$ are separated from the remnant $A_3$, and arranged at a position spaced away from the remnant $A_3$ downward by a distance "d". In the present embodiment, the product parts $A_1$ and $A_2$ are moved downward together with the base 32 until contacting the upper surface of the main body 84 of the jig 82.

At Step S4, the controller 14 maintains the position of the remnant attraction parts 36 relative to the product attraction parts 34. Specifically, the controller 14 maintains the position of the movable part 56 relative to the shafts 46 by balancing air pressure in the cylinder of the position maintaining part 80. As a result, the position of the remnant attraction parts 36 relative to the product attraction parts 34 can be maintained.

Figure 8:
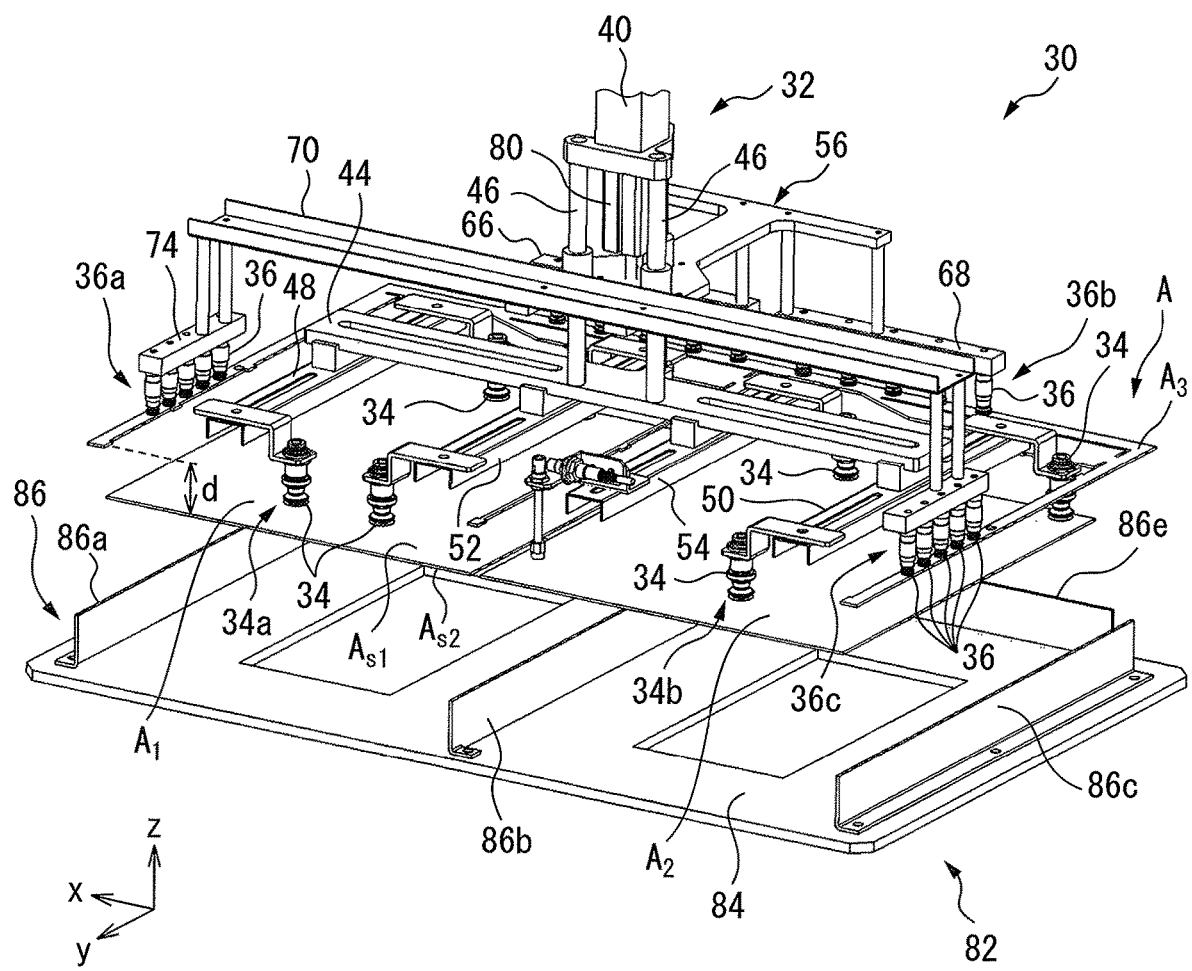
FIG. 8 is a perspective view showing a state where the substrate shown in FIG. 7 is pulled upward.

At Step S5, the controller 14 operates the robot arm 22 so as to move the base 32 in the upward direction (a second direction). At this time, since the position of the movable part 56 relative to the shafts 46 is maintained by the position maintaining part 80, the product parts $A_1$, $A_2$ and the remnant $A_3$ are pulled upward (i.e., pulled toward the top surface $A_{s1}$ side) while maintaining the distance "d" between the product parts $A_1$, $A_2$ and the remnant $A_3$. This state is shown in FIG. 8.

Then, the controller 14 moves the substrate A to a product storage (not shown) for storing the product parts $A_1$ and $A_2$. Specifically, the controller 14 operates the robot arm 22 in accordance with the robot program so as to arrange the substrate A at a predetermined position above the product storage.

At Step S6, the controller 14 releases attraction of the product attraction parts 34. Specifically, the controller 14 stops the attraction operation of the product attraction parts 34 so as to release the product parts $A_1$ and $A_2$ from the product attraction parts 34. Thereby, the product parts $A_1$ and $A_2$ are stored in the product storage.

At Step S7, the controller 14 moves the remnant $A_3$ to a remnant storage (not shown) for storing the remnant $A_3$. Specifically, the controller 14 operates the robot arm 22 in accordance with the robot program so as to arrange the remnant $A_3$ at a predetermined position above the remnant storage.

At Step S8, the controller 14 releases attraction of the remnant attraction parts 36. Specifically, the controller 14 stops the attraction operation of the remnant attraction parts 36 so as to release the remnant $A_3$ from the remnant attraction parts 36. Thereby, the remnant $A_3$ is stored in the remnant storage.

Figure 5:
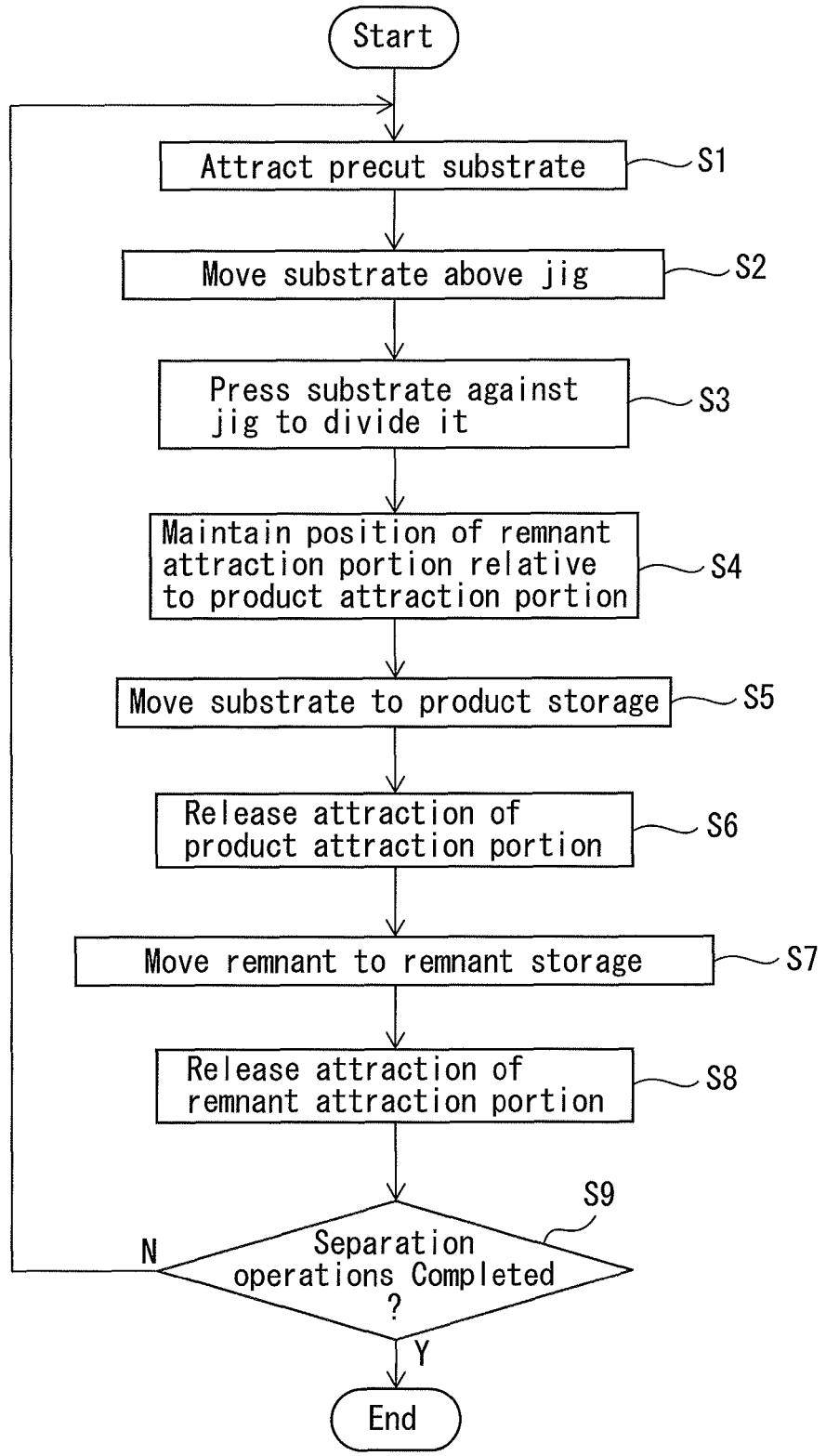
FIG. 5 is a flow chart showing an example of an operation flow of the robot system shown in FIG. 1.

At Step S9, the controller 14 determines whether all of the separation operations on substrate have been completed. When determining "NO", the controller 14 returns to Step S1. On the other hand, when determining "YES", the flow shown in FIG. 5 is ended.

As described above, according to the device 30 of the present embodiment, the remnant $A_3$ is sandwiched and fixed between the remnant attraction parts 36 and the rising part 86, while the product parts $A_1$ and $A_2$ are pushed to move by the product attraction parts 34.

As a result, it is possible to reliably release the catch between the product parts $A_1$, $A_2$ and the remnant $A_3$ of the substrate A. Thus, according to the present embodiment, it is possible to advantageously divide a substrate into a product part and a remnant, even if the remnant has a complicated shape and the remnant and the product part are complicatedly tangled with each other as the above-mentioned substrate A, for example.

Further, according to the present embodiment, the position of the remnant attraction parts 36 relative to the product attraction parts 34 is maintained by the position maintaining part 80, after the separation of the substrate A. Due to this, it is possible to convey the product parts $A_1$, $A_2$ and the remnant $A_3$ to the product storage and the remnant storage while separating the product parts $A_1$, $A_2$ away from the remnant $A_3$ by the distance "d".

Therefore, it is possible to reliably prevent the product parts $A_1$, $A_2$ from being tangled with the remnant $A_3$ when conveying the substrate A after separation, so the product parts $A_1$, $A_2$ and the remnant $A_3$ can be smoothly stored in the product storage and the remnant storage, respectively.

In the above embodiment, a case was described where the remnant attraction parts 36 are provided to be movable relative to the product attraction parts 34 via the movable part 56. Alternatively, by fixing the product attraction parts 34 to the movable part 56 and fixing the remnant attraction parts 36 to the base 32 (e.g. the base arm 44), the product attraction parts 34 may be disposed to be movable relative to the base 32 and the remnant attraction parts 36.

In this case, the remnant attraction parts 36 constitutes a first attraction part which attracts the top surface $A_{s1}$ of the remnant $A_3$ (first part) and which is moved downward. On the other hand, the product attraction parts 34 constitutes a second attraction part which is provided to be movable relative to the first attraction part and which attracts the top surface $A_{s1}$ of the product parts $A_1$, $A_2$ (second part). Further, the jig of this case includes a rising part which contacts the back surface $A_{s2}$ of the product parts $A_1$, $A_2$, unlike the above-described jig 82.

Further, in the above-described embodiment, a case was described where the position maintaining part 80 is comprised of a hydraulic or pneumatic cylinder. However, any structure can be applied to the position maintaining part 80, such as a motor, a one-way clutch or a butting part, if it can maintain the position of the movable part 56 relative to the shafts 46.

Further, in the above-described embodiment, a case was described where each of the attraction parts 34, 36 is comprised of an air suction type attraction device. However, the attraction part 34, 36 may be comprised of e.g. an electromagnet or a sucker.

While the invention has been described relative to the embodiment of the invention in the foregoing, the above-described embodiment does not limit the invention as recited in the scope of claims for patent. In addition, although a mode combining the features described in the embodiment of the invention can be also included in the technical range of the invention, not all the combinations of these features are always essential for solution means of the invention. Further, it is also apparent for those skilled in the art that various modifications or improvements can be added to the above-described embodiment.

It should be noted that with regard to an execution order of each processing such as operation, a procedure, a step, a process, a stage and the like in the device, the system, the program and the method shown in the scope of claims for patent, the specification and the figures, each processing can be realized in an arbitrary order unless explicit description is made in particular such as "before . . . " and "prior to . . . " and an output of prior processing is used in subsequent processing. With regard to an operation flow in the scope of claims for patent, the specification and the figures, even when description has been made using "first", "next", "then" and the like for convenience sake, it does not means that execution in this order is essential.

The invention claimed is:

1. A robot comprising:
a device for untangling parts of a substrate, the device comprising:
 a base;
 a movable part movably mounted to the base so as to be movable relative to the base between a first position and a second position;
 a first attraction part fixed to the base, and having a first attraction surface arranged in a first plane, the first attraction surface configured for attracting a first part of the substrate;
 a second attraction part fixed to the movable part, and having a second attraction surface arranged in a second plane, the second attraction surface configured for attracting a second part of the substrate, the first plane and the second plane being coplanar when the movable part is arranged at the first position, while the first plane is separated from the second plane in a direction toward the first position from the second position when the movable part is arranged at the second position;
 a jig configured for contacting the second part of the substrate from a side of the substrate opposite to the second attraction part; and
 a position maintaining part configured for maintaining the movable part at the second position with respect to the base; and
a robot arm connected to the base, the robot arm configured to move the base in a state where the movable part is arranged at the first position, and cause the first attraction surface to contact the first part of the substrate together with causing the second attraction surface to contact the second part of the substrate while the second part of the substrate is contacting the jig,
wherein the first attraction part is configured to attract the first part of the substrate at the first attraction surface and the second attraction part is configured to attract the second part of the substrate at the second attraction surface when the first attraction surface and the second attraction surface contact the first part of the substrate and the second part of the substrate, respectively.

2. The robot according to claim 1, wherein the substrate is a flat plate, wherein
a first direction is perpendicular to the second plane, and wherein
the second attraction part is movable relative to the first attraction part in a direction parallel to the first direction.

3. A robot system comprising:
the robot according to claim 1; and
a controller which controls the robot.

4. The robot system according to claim 3, wherein
the controller causes the robot arm to move the first attraction part in the first direction, thereby pushing the first part of the substrate attracted by the first attraction part in the first direction so as to separate the first part of the substrate from the second part of the substrate;
the position maintaining part maintains a position of the second attraction part relative to the first attraction part when the first part of the substrate is separated from the second part of the substrate; and
the controller causes the robot arm to move the first attraction part in a second direction opposite to the first direction while maintaining the position of the second attraction part relative to the first attraction part.

\* \* \* \* \*